United States Patent
Rennó

(10) Patent No.: US 11,719,826 B1
(45) Date of Patent: Aug. 8, 2023

(54) HYDROMETEORS, AIRCRAFT ICING, AND ROAD CONDITION MONITORING SYSTEM

(71) Applicant: THE REGENTS OF THE UNIVERSITY OF MICHIGAN, Ann Arbor, MI (US)

(72) Inventor: Nilton O. Rennó, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 17/679,556

(22) Filed: Feb. 24, 2022

(51) Int. Cl.
| | |
|---|---|
| *G01N 21/33* | (2006.01) |
| *G01S 17/95* | (2006.01) |
| *G01B 11/30* | (2006.01) |
| *G01N 21/359* | (2014.01) |
| *G01N 21/3577* | (2014.01) |
| *G01B 11/02* | (2006.01) |

(52) U.S. Cl.
CPC .............. *G01S 17/95* (2013.01); *G01B 11/02* (2013.01); *G01B 11/30* (2013.01); *G01N 21/33* (2013.01); *G01N 21/359* (2013.01); *G01N 21/3577* (2013.01)

(58) Field of Classification Search
CPC ......... G01S 17/95; G01B 11/02; G01B 11/30; G01N 21/33; G01N 21/3577; G01N 21/359
See application file for complete search history.

(56) References Cited

U.S. PATENT DOCUMENTS

| | | | |
|---|---|---|---|
| 3,276,254 A | 10/1966 | Richard | |
| 4,660,038 A * | 4/1987 | Greneker, III | ........ G01S 13/951 342/115 |
| 7,104,502 B2 | 9/2006 | Otto et al. | |
| 7,370,525 B1 | 5/2008 | Zhao et al. | |
| 9,304,081 B2 | 4/2016 | Rennó | |

(Continued)

FOREIGN PATENT DOCUMENTS

| | | |
|---|---|---|
| JP | 6542619 B2 | 7/2019 |
| KR | 101307178 B1 | 9/2013 |

(Continued)

OTHER PUBLICATIONS

Le et al., "Hydrometeor profile characterization method for dual-frequency precipitation radar onboard the GPM," IEEE Transactions on Geoscience and remote sensing, vol. 51, No. 6, pp. 3648-3658. (Year: 2013).*

(Continued)

*Primary Examiner* — Kiho Kim
(74) *Attorney, Agent, or Firm* — Harness, Dickey & Pierce, P.L.C.

(57) ABSTRACT

A method for monitoring the airspace around an aircraft or the road, runway, taxiway, movement area condition or any other object or surface of interest ahead of a vehicle, even in inclement weather is disclosed. The present teachings provide a system for characterizing cloud drops, cloud ice particles, other hydrometeors such drizzle, rain or falling snow, and for distinguishing dry surfaces from those covered by water, snow, frost, and various types of ice even when they cover only a fraction of the field of view of the road condition monitoring system, even in inclement weather.

12 Claims, 3 Drawing Sheets

(56) References Cited

U.S. PATENT DOCUMENTS

2008/0129541 A1    6/2008   Lu et al.
2014/0232566 A1    8/2014   Mimeault et al.

FOREIGN PATENT DOCUMENTS

KR      1020180093369 A     8/2018
WO    WO-2019086246 A1 *   5/2019

OTHER PUBLICATIONS

Ray, M., & Anderson, K. (2015). Analysis of flight test results of the optical ice detector. SAE International Journal of Aerospace, 8(2015-01-2106), 1-8.

Lozowski, E. P., Oleskiw, M., Blackmore, R. Z., Karev, A., Kolar, L., and Farzaneh, M. (2005). Spongy icing revisited: measurements of ice accretion liquid fraction in two icing wind tunnels. In 43rd AIAA Aerospace Sciences Meeting and Exhibit (pp. 2005-2658). AIAA Reno, Nevada.

Kokhanovsky, A. A., V. V. Rozanov, E. P. Zege, H. Bovensmann, and J. P. Burrows (2003). A semianalytical cloud retrieval algorithm using backscattered radiation in 0.4-2.4 mm spectral region, J. Geophys. Res., 108(D1), 4008, doi:10.1029/2001JD001543.

Halama, G., Ray, M., Anderson, K., Nesnidal, M., and Ide, R. (2010) Optical Ice Detection: Test Results from the NASA Glenn Icing Research Tunnel. In AIAA Atmospheric and Space Environments Conference (p. 7532).

FAA (1997). FAA Inflight Aircraft Icing Research Plan. FAA Report, Apr. 1997.

EUROCAE ED-103A (2017). Minimum Operation Performance Standard for Inflight Icing Detection Systems, EUROCAE.

Anderson, K.J, and M.D. Ray (2019). SLD and Ice Crystal Discrimination with the Optical Ice Detector. International Conference on Icing of Aircraft, Engines, and Structures. Technical Paper 2019-01-1934, e-ISSN: 2688-3627.

International Search Report and Written Opinion regarding International Application No. PCT/US2022/017996, dated Nov. 24, 2022.

* cited by examiner

HYDROMETEORS, AIRCRAFT ICING, AND ROAD CONDITION MONITORING SYSTEM

FIELD

The present disclosure relates to a condition monitoring system and, more particularly, relates to a cloud, fog, rain, drizzle, falling snow, other hydrometeors, aircraft icing, and road condition monitoring system.

BACKGROUND AND SUMMARY

This section provides background information related to the present disclosure that is not necessarily prior art. This section provides a general summary of the disclosure and is not a comprehensive disclosure of its full scope or all its features.

The present teachings provide a system configured for determining the thermodynamic phase of cloud water and precipitation water, for characterizing cloud drops, cloud ice particles, other hydrometeors such as fog, rain, and falling snow, and/or assessing the conditions that could cause aircraft icing, and/or could indicate that roads and any other surface of interest is wet or covered by ice, frost or snow, even in inclement weather (e.g., in fog, rain, and falling snow).

In some embodiments, the system is configured to characterize hydrometeors for quantitative assessments of aircraft icing hazard potential such hydrometeors thermodynamic phase, effective radius, mean volume radius, size distribution, and hydrometeors cloud liquid water content. In these embodiments, the system characterizes supercooled water drops that freeze when impacting the surfaces of airborne vehicles such as aircraft. In other embodiments, the system is configured to distinguish dry surfaces from those covered by water, snow, frost, and various types of ice even when they cover only a fraction of the field of view, even in inclement weather. Furthermore, in some embodiments the system is configured to characterize both hydrometeors and surface conditions simultaneously.

The detection of water drops, ice particles, other hydrometeors, and the associated surface conditions is an important factor in the safety of various modes of transportation. It is well known that either ice or water accumulation on road surfaces can increase the probability of vehicle accidents, personal injuries resulting from falls, and disruptions in transportation and other human activities. Water and ice can often be difficult to detect by drivers or current synthetic vision systems. Clear ice (black or glaze ice) is unusually difficult to detect. Unfortunately, practical systems capable of reliably detecting ice or water on roads do not exist.

With reference to aviation, icing can be a hazard to any aircraft flying in ubiquitous water clouds, fog, drizzle, or rain when their temperature is below about 0° C. Indeed, icing has been responsible for some of the most catastrophic inflight aviation accidents of the past few decades because it can cause loss of control. Some of the most advanced commercial aircraft in production have suffered catastrophic icing-related problems even while in cruise. For example, Air France's Airbus A330 crash that killed 280 people in 2009 was triggered by icing in its airspeed sensors while in cruise. Similarly, some of the newest jets in operation have been experiencing icing-related engine problems while in cruise. Clearly, icing-related aircraft accidents must be reduced. This reduction would be important not only commercially, but also to save lives because about 10% of all fatal air-carrier accidents are caused by icing.

The Federal Aviation Administration (FAA) requires that manufacturers demonstrate that their aircraft can fly safely in the conditions defined by the icing certification envelopes specified in the Federal Airworthiness Regulations (FAR). These regulations and the FAA certification procedures have been changing as the result of lessons learned during accident investigations. Indeed, since 1994 the FAA has issued more than two hundred Airworthiness Directives (AD) to address icing safety on more than fifty types of aircraft. These airworthiness directives cover safety issues ranging from crew operating procedures in icing conditions to design changes. The FAA has also requested changes in Airplane Flight Manuals (AFM) and other aircraft operations documents to address icing safety.

Most icing detection systems currently in the market are based on measurements by ice-collecting probes (e.g., Richard, 1966; Otto et al., 2006) placed away from the areas where ice accretion can cause problems. Thus, they do not detect ice accretion where ice can create a hazard, such as on wings, horizontal stabilizers, and flight control surfaces. Unfortunately, the spongy ice (Lozowski et al., 2005) that forms in hazardous mixed phase regions (FAA, 1997) at about 0° C. do not adhere well to ice-detection probes. This occurs in part because the increase in temperature caused by the adiabatic compression of the air over ice-detection probes increases their temperature, inhibiting ice adherence.

Changes in the US Code of Federal Regulations (14 CFR Part 25), and the European Aviation Safety Agency (EASA) Certification Specifications (CS-25) stipulate that newly designed transport category airplanes must be able to operate safely in severe icing conditions. Alternatively, these airplanes must have a means of detecting that they are operating in severe icing conditions and operate safely while exiting all icing conditions. These recent changes in the icing certification envelopes (e.g., ED-103A, 2017) are driving a market for new icing detection technologies like those based on the technology we disclose herein.

Aircraft while on the ground and other modes of transportation such as cars, trucks, trains, automated people movers, rails, monorails, metros, buses, motorcycles, bicycles, lack suitable systems for detecting the presence of ice or water on surfaces, such as roadways, bridges, railways, sidewalks, or even runway and taxiways (such as in connection with ground operations of aircraft or supporting personnel and vehicles). Thus, these modes of transportation could benefit from the technology we disclose herein.

Ice detection in most ground vehicles merely includes a simple notification once the air temperature is at or near the freezing point of water. However, unfortunately, temperature is not a reliable indicative of the presence of road surface ice that may affect the safety or drivability of a vehicle. The fact that drivers and operators are frequently not aware of the deteriorating road condition ahead of a vehicle frequently leads to accidents.

Current aircraft icing detection systems are neither capable of measuring hydrometeors liquid water content (LWC), nor droplet size. Even some recently proposed systems detect ice accumulation only simply by measuring changes in the vibration frequency of struts mounted on the nose cone of an airplane (e.g., Otto et al., 2006), not where ice accretion can cause problems. However, the probes of newer systems contain features that allow ice to accrete on them at higher rate than in other parts of the airplane. Recently, other types of optical icing detection systems have also been developed (e.g., Zhao et al., 2008; Ray and Anderson, 2015). Zhao et al. (2008) proposed a dual band system to detect ice accretion on a housing containing a light source. The housing of this system is illuminated with linearly polarized light, while light conductors with polarization sensitivity both aligned and orthogonal to the transmitted light acquire the backscattered light. The ratio of the intensities of the light in the two light conductors is used to determine the presence or absence of ice on a probe. Unfortunately, this system is neither capable of measuring hydrometeors size nor measuring cloud liquid water content.

Optical Ice Detector (OID) systems compliant with some of the recent changes in aircraft certification regulations are currently being developed. For example, Ray and Anderson (2015) and Anderson and Ray (2019) describe an Optical Ice Detector (OID) that uses polarimetric measurements to distinguish water drops from ice particles (Halama et al., 2010), and extinction/reflectance to measure hydrometeor size and estimate cloud liquid water and ice contents (Ray and Anderson, 2015). This is a more complex and less accurate system than the one disclosed herein because it requires the polarization of the emitted light and the depolarization of the backscattered light received. This, in turn requires a more complex and, therefore, more expensive optical subsystem whose measurement accuracy decreases with increase in multiple scattering and therefore with the severity of the icing conditions.

Some of the prior art approaches for detecting slippery ice on surfaces, such as those of roads and runways, use an imager capable of measuring the polarization of the light reflected by glaze ice. However, although light is polarized when reflected by dielectric materials such as glaze ice, glaze ice is not the only dielectric material that polarizes light. In fact, reflections by wet and/or oily surfaces and even smooth asphalt also cause polarization, which would lead to false reporting of the presence of ice. Therefore, polarization is not capable of distinguishing among the possible types of dielectric materials scattering or reflecting light. Consequently, it cannot be used to detect the presence of ice or water unambiguously.

For example, U.S. Pat. Pub. No. 2008/0129541AI (Lu and Higgins-Luthman, 2008) refers to a slippery ice warning system capable of monitoring the road ahead of a vehicle. One or two cameras are used to image the same scene at two orthogonal polarizations. When a single camera is used, a polarization beam splitter is used to separate the reflected light into two orthogonal polarizations. The possible (but ambiguous) determination of the existence of slippery ice ahead of the vehicle is detected by measuring the polarization of the reflected light. However, again, this system is unable to discern whether the detected polarization is due to ice or some other polarizing reflective material.

Some of the prior art approaches for detecting aircraft icing, and ice and water on roads or other surfaces of interest are also based on optical measurements. However, these prior art techniques are more complex and less accurate than the method described in the present disclosure.

According to the principles of the present teachings, a hydrometeor, aircraft icing, and road condition monitoring system is provided that is configured to determine the thermodynamic phase of hydrometeors, characterizing cloud drops (e.g., Kokhanovsky et al., 2003), characterizing cloud ice particles, characterizing other hydrometeors such as fog, drizzle, rain, and snow (e.g., Pruppacher et al., 2010), and further, in some embodiments, also configured to assess aircraft icing hazard potential. This hydrometeors, aircraft icing, and road condition monitoring system overcomes the disadvantages of the prior art and is particularly useful for monitoring both aircraft icing hazards, and slippery road conditions. In some embodiments of the present teachings, the system is configured to detect fog, rain, falling snow, other hydrometeors, and road conditions unambiguously, even in inclement weather, by making simple reflectance measurements of the airspace around the vehicle and the road ahead.

Furthermore, in some embodiments, the system of the present teachings provides an optical system to characterize cloud water drops, cloud ice particles, and other hydrometeors such as fog, rain, and falling snow, and is configured exclusively to monitor road conditions, even in inclement weather. Road conditions refer to water, snow, frost, clear ice (also referred to as black or glaze ice), and other types of ices on roads or any other surface of interest. In some embodiments, the system is configured exclusively to characterize supercooled water droplets that freeze when impacting the surfaces of airborne vehicles, such as aircrafts, Unmanned Air Vehicles (UAVs), Urban Air Mobility (UAM) vehicles, other vehicles, and other objects of interest, and to characterize hydrometeors such as fog, drizzle, rain, and snow in the airspace around aircraft or ground vehicles.

In some embodiments, the system can be passive while in most embodiments light sources are included, multispectral detectors and/or multispectral camera, a data processor unit, and interfaces with displays, safety systems, and/or autonomous systems to provide an indication of the aircraft icing condition or the road condition and a response to them.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and they are not intended to limit the scope of the present disclosure.

Corresponding reference numerals indicate corresponding parts throughout the several views of the drawings.

DETAILED DESCRIPTION

Figure 1:
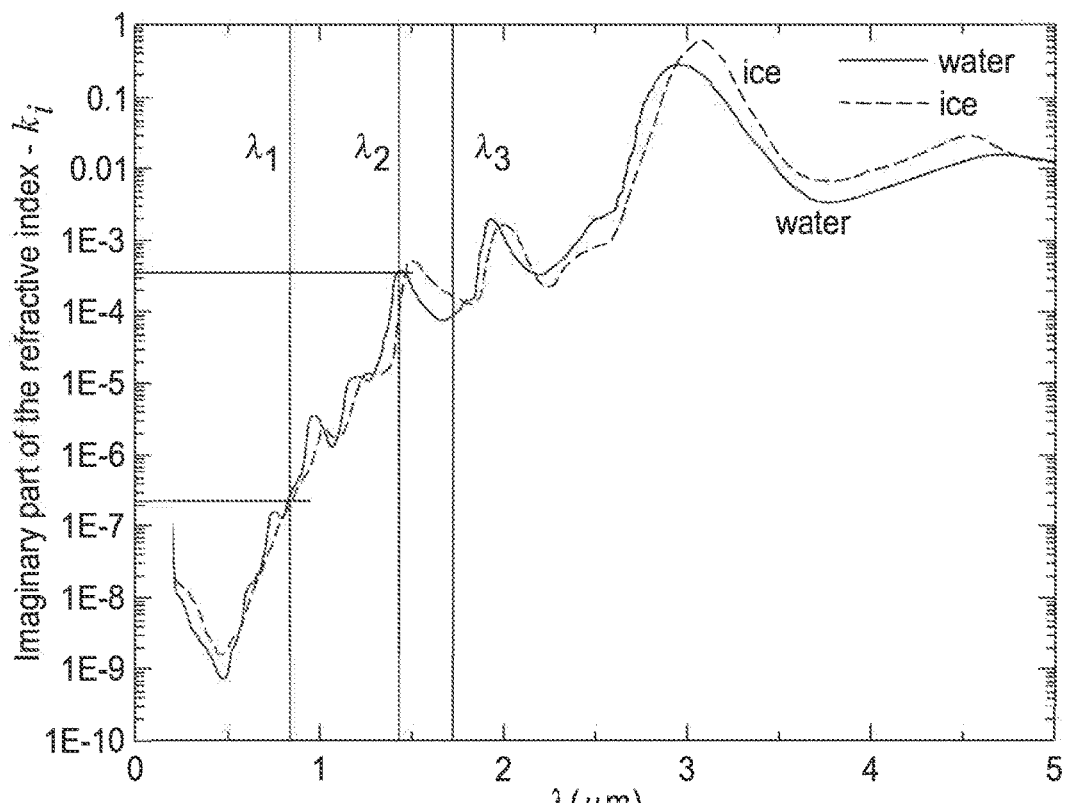
FIG. 1 illustrates the imaginary part of the complex index of refraction (also referred to as extinction coefficient) of liquid water and ice indicating that reflectance is measured in spectral bands centered at wavelengths $\lambda_1$, $\lambda_2$ and $\lambda_3$.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present teachings provide a system for monitoring the airspace around or ahead of an aircraft, or the conditions around or ahead of a land vehicle. The present teachings provide a system for characterizing cloud drops, cloud ice particles, other hydrometeors such rain, drizzle, for or snow, and for distinguishing dry roads or runways from those covered by water, snow, frost, and various types of ice even when they cover only a fraction of the field of view of the road condition monitoring system, even in inclement weather.

Generally, in some embodiments, the hydrometeors, aircraft icing, and road condition monitoring system are configured to determine the thermodynamic phase of cloud water, characterizing cloud drops, characterizing cloud ice particles, characterizing other hydrometeors such as fog, rain, and falling snow, and further monitoring road conditions, even in inclement weather. In these embodiments the characterization of clouds, airborne hydrometeors, and road conditions is based on measurements of the reflectance in three spectral bands centered at wavelengths $\lambda_1$, $\lambda_2$ and $\lambda_3$. The determination of the thermodynamic phase of the hydrometeors or the water on the road is accomplished by measuring the reflectance in two spectral bands centered at wavelengths $\lambda_2$ and $\lambda_3$, selected to assure that the absorption of radiance by water and ice is strong enough in these two spectral bands to alter the spectral distribution of the reflected signal. In addition, the bands centered at $\lambda_2$ and $\lambda_3$ are selected as having wavelengths in which the absorption of radiance by ice and water differ enough for separating the reflectance signals of water from that of ice. The size distribution of cloud drops, ice particles, and other hydrometeors, and their liquid water or ice water content are estimated based on measurements in two spectral bands; but in this case at a first band centered at a wavelength $\lambda_1$ in which the absorption of radiance by ice particles and water drops are small enough to be neglected in calculations of reflectance, and at a second band centered at a wavelength in which the absorption of radiance by ice particles and water drops are large enough to significantly affect the reflectance. This second band can be centered at the same wavelength as one of the two bands used for determination of the thermodynamic phase, that is $\lambda_2$ or $\lambda_3$.

In this disclosure we use bands centered at $\lambda_1$ and $\lambda_2$ for characterizing the size distribution and water content of hydrometeors. The measurements at $\lambda_1$ and $\lambda_2$ allow the radiative transfer problem, though clouds and hydrometeors, to be solved either numerically, or mathematically using an approximate system of analytical equations. Band $\lambda_1$ can be selected anywhere between the ultraviolet and near infrared portions of the spectrum, where the absorption of electromagnetic radiation (radiance) by water and ice is negligible small, while bands $\lambda_2$ or $\lambda_3$ can be selected anywhere in the shortwave infrared portion of the spectrum, where the absorption of electromagnetic radiation by water and ice is large enough to affect the reflectance significantly. Once the hydrometeors are characterized, the reflectance of the road surface ahead of a vehicle is determined by removing the effect of the hydrometeors from the road reflectance signal measured though the hydrometeors ahead of the vehicle. This allows the determination of the road conditions, even in inclement weather. The characterization of hydrometeors, including cloud drops, can be used for assessing icing hazard potential to airborne vehicles because icing severity is a function of the supercooled liquid water content and the drop size distribution. A processing unit determines the thermodynamic phase of cloud water, characterizes cloud drops, characterizes cloud ice particles, characterizes other hydrometeors such as fog, drizzle, rain, and snow, and monitors the aircraft icing hazard potential and/or road conditions.

With reference to the figures, a hydrometeors, aircraft icing, and road condition monitoring system is provided for use by either ground or air vehicles according to the principles of the present teachings. In some embodiments, the system is configured for characterizing hydrometeors and assessing aircraft icing hazard potential by monitoring the thermodynamic phase of cloud water, characterizing cloud drops, characterizing rain, characterizing other hydrometeors such as fog, drizzle, and falling snow, and further, in some embodiments, the system is configured as a hydrometeor characterization and runway condition monitoring system, even in inclement weather. In some embodiments of the present teachings, the system characterizes cloud drops, cloud ice particles, other hydrometeors, and road conditions unambiguously, even in inclement weather.

As illustrated in FIG. 1, the imaginary part of the complex index of refraction of liquid water and ice indicating that reflectance is measured in spectral bands centered at wavelengths $\lambda_1$, $\lambda_2$ and $\lambda_3$. The measurement bands are centered at wavelengths $\lambda_1$, $\lambda_2$ and $\lambda_3$ to allow the characterization of drop size distribution, and cloud or other hydrometeors liquid water content. The imaginary part of the refractive index of ice and water is about 1000 smaller at $\lambda_1$ than at $\lambda_2$ and $\lambda_3$. Measurements at $\lambda_2$ and $\lambda_3$ allow the determination of the thermodynamic phase of cloud particles and of other hydrometeors.

As described herein, in some embodiments, the system of the present teachings provides an optical system configured to characterize cloud water drops, cloud ice particles, and other hydrometeors such as fog, drizzle, rain, and snow, and in some embodiments is configured to monitor road conditions, even in inclement weather. Road conditions refer to water, snow, frost, clear ice (also referred to as black or glaze ice), and other types of ices on roads, runways, or any other surface of interest. In some embodiments, this system is configured to characterize supercooled water droplets that freeze when impacting the surfaces of airborne vehicles, such as aircrafts, Unmanned Air Vehicles (UAVs), Urban Air Mobility (UAM) vehicles and other objects of interest, and of characterize hydrometeors such as cloud drops, ice particles, fog, drizzle, rain, and snow in the airspace around air or ground vehicles.

In some embodiments, the system can be passive while in most embodiments light sources are included, multispectral detectors and/or multispectral camera, a data processor unit, and interfaces with displays, safety systems, and/or autonomous systems to provide an indication of the aircraft icing condition or the road condition and a response to them.

Figure 2:
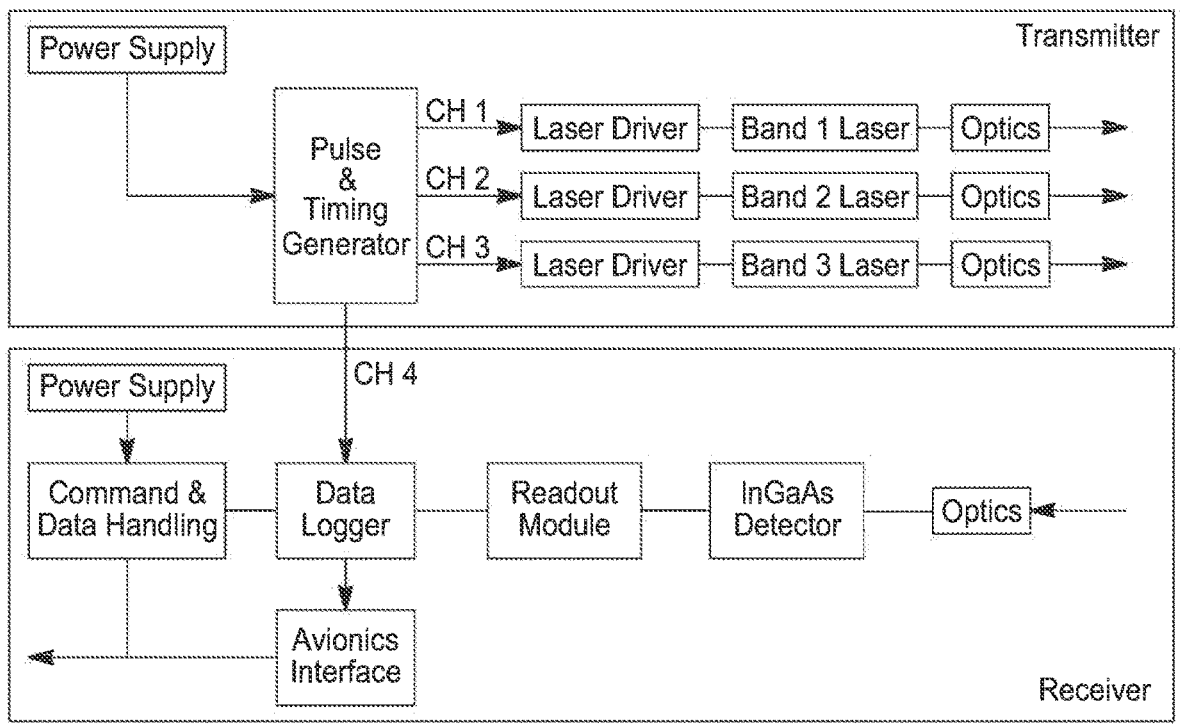
FIG. 2 illustrates a block diagram of an implementation of the hydrometeors, aircraft icing, and road condition monitoring system for use by either ground or air vehicles according to the principles of the present teachings.

FIG. 2 provides a block diagram of an implementation of the hydrometeors, aircraft icing, and road condition monitoring system for use by either ground or air vehicles. In some embodiments, the system comprises a transmitter system and a receiver system. In some embodiments, the transmitter subsystem comprises a power supply, a pulsing and timing generator, three laser drivers emitting light at spectral bands centered at wavelengths $\lambda_1$, $\lambda_2$ and $\lambda_3$, laser diodes, and transmitting optics to illuminate the cloud or road. In some embodiments, the receiver subsystem comprises a power supply, a command and data-handling (C&DH) system to process the signal received, a data logger to interface the system with the aircraft avionics or the ground vehicle bus, a readout module, a detector module, and signal receiving optics.

Figure 3:
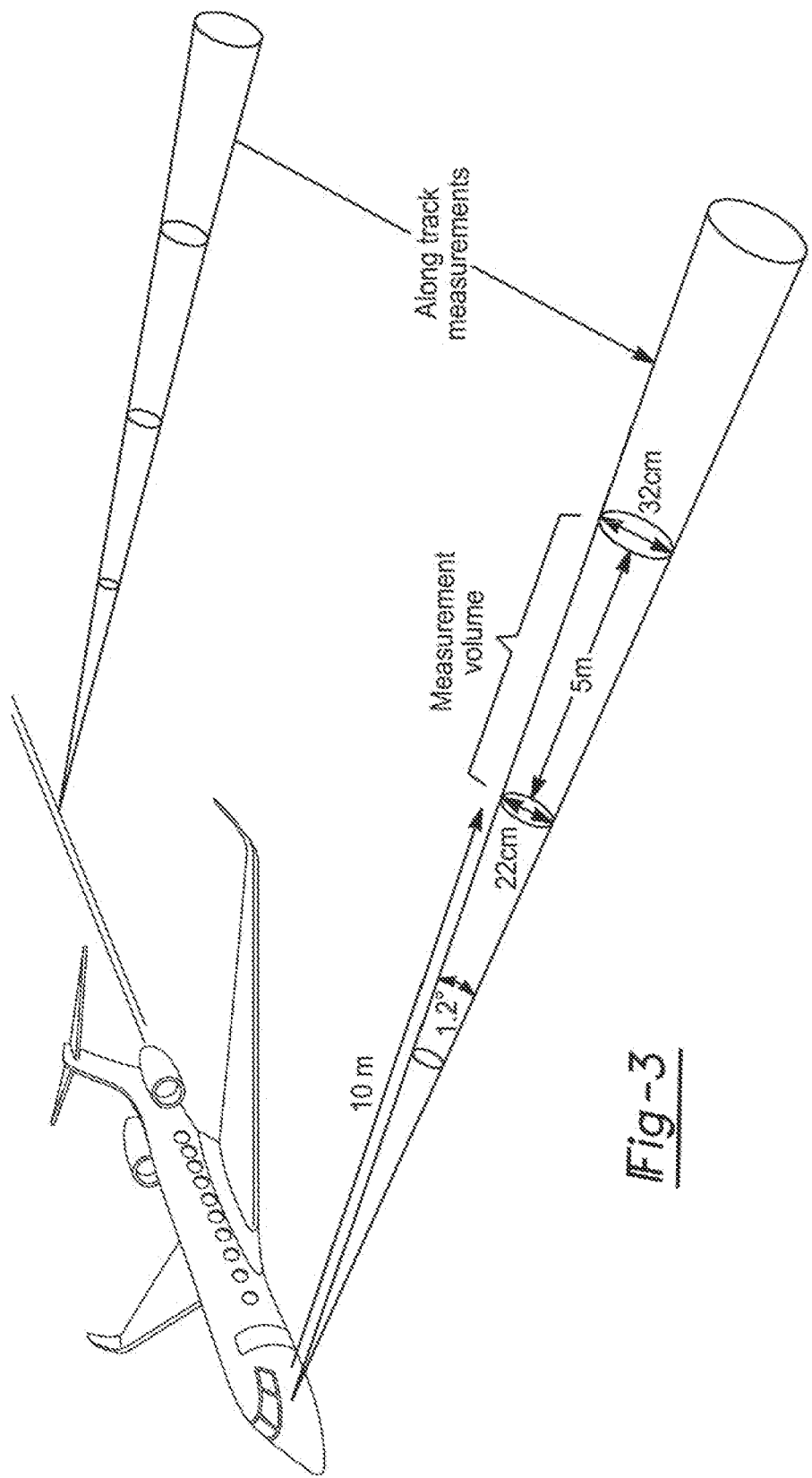
FIG. 3 illustrates a schematic of the hydrometeors, aircraft icing, and road condition monitoring system being used to characterize hydrometeors in the airspace around an aircraft to assess aircraft icing hazard.

As illustrated in FIG. 3, the hydrometeors, aircraft icing, and road condition monitoring system can be used to characterize clouds and other hydrometeors in the airspace around an aircraft. In this implementation, the system can be used to specifically detect aircraft icing hazard. The field of view can be in any direction desired but pointing directly towards the sun shall be avoided. If the aircraft system is pointed ahead and slightly downwards it can also be used to monitor the conditions of runways, taxiways, and movement areas.

Figure 4:
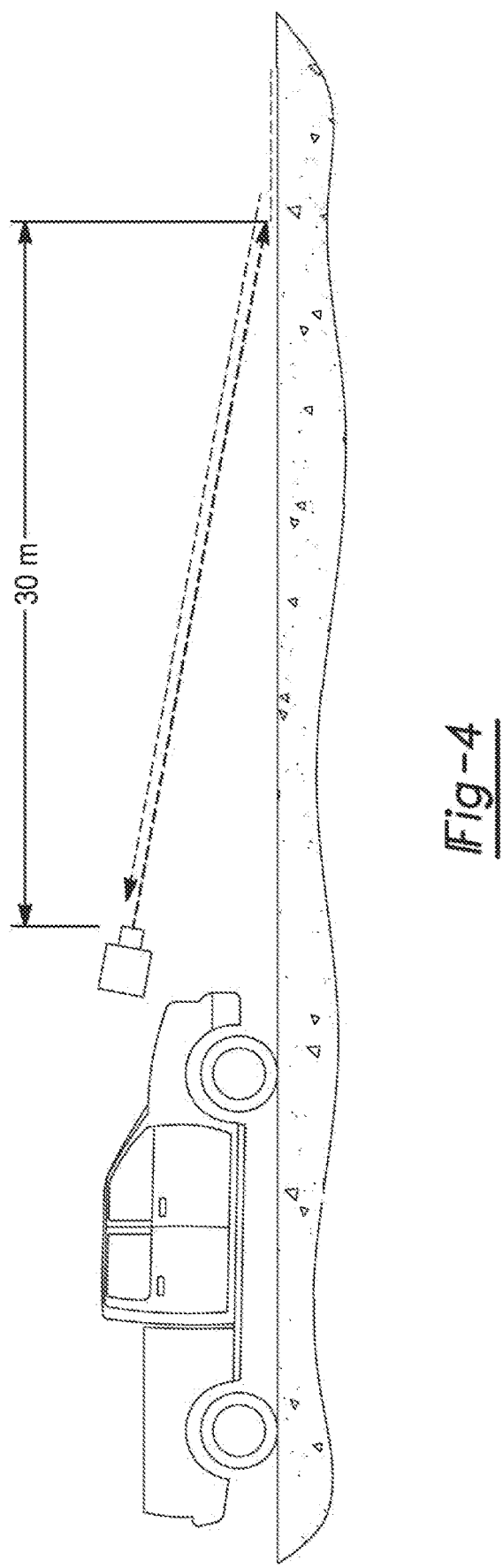
FIG. 4 illustrates a schematic of the hydrometeors, aircraft icing, and road condition monitoring system being used to measure the road condition and characterize hydrometeors ahead of a vehicle to alert the driver or automation system of slippery conditions. The coefficient of friction between the vehicle tire and the road can be estimated based on the measurements.

As illustrated in FIG. 4, the hydrometeors, aircraft icing, and road condition monitoring system can be used to characterize hydrometeors and measure the road condition ahead of a vehicle. In this implementation, the system can be used to alert the driver or automation system of slippery conditions. The coefficient of friction between the vehicle tire and the road can be estimated based on the measurements. Hydrometeors such as fog, drizzle, rain, and snow are characterized by making gated measurement of the signal reflected by the hydrometeors before a laser pulse train reaches the road.

The present teachings use measurements of reflectance in the three spectral bands indicated in FIG. 1 to characterize hydrometeors and estimate the road conditions ahead of a vehicle. The present teachings provide a system that alerts the pilot, or the driver, or provides feedback to the aircraft or vehicle's automation systems. The present system can quantify the hazard level using icing level assessments, or road condition level assessments. An algorithm for characterizing cloud drops, other hydrometeors, assessing aircraft icing hazard level, and assessing the condition of the road ahead of a vehicle, even in inclement weather, could comprise of the following steps:

Step 1: Conduct time gated measurements of the first parameter (the airspace or the hydrometeors reflectance), and the second parameter (the road, runway, taxiway, or movement area reflectances $R_{i=1,2,3}$ possibly including reflectance signals from hydrometers within the field of view) in three spectral bands centered at wavelengths $\lambda_1$, $\lambda_2$ and $\lambda_3$ (that is, $R_1$ at $\lambda_1$, $R_2$ at $\lambda_2$, and $R_3$ at $\lambda_3$). After these measurements, calculate the scaled reflectance $\check{R}_1$ measured at $\lambda_1$, the scaled reflectance $\check{R}_2$ measured at $\lambda_2$, and the scaled reflectance $\check{R}_3$ measured at $\lambda_3$, first based on the first parameter to characterize the hydrometeors, and then based on the second parameter to assess the condition of the road, runway, taxiway, or movement area. The preferred scaling factors are Lambertian reflectance at each of these three wavelengths, $\lambda_1$, $\lambda_2$ and $\lambda_3$, but other scaling factors could also be used.

Step 2: Use the first parameter scaled reflectance $\check{R}_1$, $\check{R}_2$ and $\check{R}_3$ to determine if hydrometeors are present in the airspace. Hydrometeors are present if at least one of the first parameter scaled reflectance $\check{R}_{i=1,2,3}$ is larger than a corresponding critical value, $\check{R}_{i=1,2,3}^{hc}$.

Step 3: If hydrometers are present in the airspace, determine if they are composed of ice, water, or mixtures of ice and water; that is, determine the thermodynamic phase of the hydrometeors. The thermodynamic phase of the hydrometeors is determined by calculating the ratio $\gamma$ of the first parameter scaled reflectance measured at wavelengths $\lambda_2$ and $\lambda_3$, that is $$\gamma = \frac{\tilde{R}_3}{\tilde{R}_2},$$

where for preferred spectral bands $\gamma<\gamma_{hc}^{ice}$ indicates ice particles and $\gamma\geq\gamma_{hc}^{water}$ indicates water drops, but other choices can also be made. Mixed phase is found between these two critical values. Once the thermodynamic phase of the hydrometeors is determined, the imaginary part of the complex index of refraction of water substance in the three measurements bands is determined with the aid of a look up table. The index of refraction is used to determine the characteristics of the hydrometeors in subsequent steps.

Step 4: If hydrometers are not present in the airspace, use the second parameter scaled reflectance $\check{R}_1$, $\check{R}_2$ and $\check{R}_3$ to determine the road, runway, taxiway, or movement area condition when a aircraft is at or near the ground. In this case, the road, runway, taxiway, or movement area condition is determined by calculating the ratio $\gamma$ of the second parameter scaled reflectance measured at wavelengths $\lambda_2$ and $\lambda_3$, that is $$\gamma = \frac{\check{R}_3}{\check{R}_2},$$

where for preferred spectral bands $\gamma<\gamma_{rc}$ indicates icy road and $\gamma\geq\gamma_{rc}$ indicates water on the road or runway, while ratios within the overlapping interval $\gamma_{rc}-\Delta\gamma_{r1}$ and $\gamma_{rc}+\Delta\gamma_{r2}$ indicate either dry road, runway, taxiway, or movement area, or covered with both water and ice, if at least one of the second parameter scaled reflectance $\check{R}_{i=1,2,3}$ is smaller than a corresponding critical value, $\check{R}_{i=1,2,3}^{rc}$ indicating the presence of an absorber of electromagnetic radiation.

Step 5: Use the first parameter scaled reflectance to determine the hydrometeors effective radius $a_e$, and the hydrometeors cloud liquid water path w, by solving a system of radiative transfer equations, one equation being for the scaled reflectance $\check{R}_1$ in a spectral band centered at wavelength $\lambda_1$ selected between the ultraviolet and near infrared portions of the spectrum, where the absorption of electromagnetic radiation by water and ice is small enough to be neglected, and the other equation being for the scaled reflectance $\check{R}_2$ in a band centered at wavelength $\lambda_2$ selected in the shortwave infrared portion of the spectrum where the absorption of electromagnetic radiation by water and ice is large enough to affect reflectance significantly. The system of equations is preferably derived mathematically from simplifications of the radiative transfer equations, one equation being for the scaled reflectance at $\lambda_1$, that is of the form $$\check{R}_1(a_e,w)=R_\infty^0(\theta)-f(a_e,w,\theta,A_1),$$

and the other equation being for the scaled reflectance at $\lambda_2$, that is of the form $$\check{R}_2(a_e,w)=R_\infty^0(\theta)g(a_e,w)+h(a_e,w,A_2)+q(a_e,w,\theta),$$

where $R_\infty^0(\theta)$ is the reflection function of a semi-infinity non-absorbing cloud of hydrometeors, $\theta$ is the scattering angle in radians, $a_e$ is the hydrometeors effective radius, w is the hydrometeors cloud liquid water path, $A_1$ is the surface (e.g., road, runway, taxiway, or movement area) albedo at a spectral band centered at wavelength $\lambda_1$, $A_2$ is the surface (e.g., road, runway, taxiway, or movement area) albedo at a spectral band centered at wavelength $\lambda_2$, and f, g, h and q are analytical functions. The dependence on the index of refraction is included implicitly in these analytical functions.

Step 6: Write the system of equations of step 5 as a single analytical equation of a single variable, the hydrometeors effective radius $a_e$, using the equation for the first parameter reflectance $\check{R}_1$ to determine the hydrometeors cloud liquid water path w as a function of the hydrometeors effective radius $\tilde{w}(a_e)$, and substituting the expression for it in the equation for the first parameter reflectance $\check{R}_2$, that is $$\check{R}_2(a_e)=R_\infty^0(\theta)f(a_e,\tilde{w})+g(a_e,\tilde{w},A_2)+h(a_e,\tilde{w},\theta).$$

Then, determine the hydrometeors effective radius $a_e$ by finding the root of this equation with the aid of a root-finding subroutine like zbrent (Brent, 1973).

Step 7: Determine the hydrometeors ice content, liquid water content, or mixed phase content. Once the hydrometeors effective radius $a_e$ is determined, the hydrometeors cloud liquid water path w is calculated using the analytical expression for the hydrometeors liquid water path w as a function of the hydrometeors' effective radius, that is $w=\tilde{w}(a_e)$. Because the reflectance measurements are time gated, the path length l is known, and therefore the liquid water content (LWC), ice water content (IWC), or mixed water phase content (MWC) can be estimated as $$IWC \text{ or } LWC \text{ or } MWC = \frac{w}{l}.$$

If the result of step 3 is that ice has been detected, the result of is flagged as IWC, if water has been detected, it is flagged as LWC, and if mixed phase has been detected, it is flagged as MWC.

Step 8: Determine the hydrometeors mean and maximum mean volume radius. From the hydrometeors effective radius $a_e$, their mean volume radius and maximum radius are estimated based on the typical drop size distribution (e.g., gamma) for clouds, drizzle, and rain.

Step 9: Use the second parameter to determine the road, runway, taxiway, or movement area condition in inclement weather. Once the hydrometeors effective radius $a_e$ and liquid water path w are known, the radiative transfer equations discussed in step 5, are solved for the surface spectral albedos using a root finding subroutine like zbrent. That is, the spectral albedo $A_1$ is determined by finding the root of the second parameter scaled reflectance at $\lambda_1$, that is $$\check{R}_1(A_1)=R_\infty^0(\theta)-f(a_e,w,\theta,A_1),$$

the spectral albedo $A_2$ is determined by finding the root of the second parameter scaled reflectance at $\lambda_2$, that is $$\check{R}_2(A_2)=R_\infty^0(\theta)g(a_e,w)+h(a_e,w,A_2)+q(a_e,w,\theta),$$

and the spectral albedo $A_3$ is determined by finding the root of the second parameter scaled reflectance at $\lambda_3$, that is $$\check{R}_3(A_3)=R_\infty^0(\theta)g(a_e,w)+h(a_e,w,A_3)+q(a_e,w,\theta).$$

The road, runway, taxiway, or movement area condition in inclement weather is determined by calculating the ratio $\gamma$ of the surface spectral albedos at wavelengths $\lambda_2$ and $\lambda_3$, that is $$\gamma = \frac{A_3}{A_2},$$

where for preferred spectral bands $\gamma<\gamma_{rc}$ indicates icy road and $\gamma\geq\gamma_{rc}$ indicates water on the road or runway (other choices can also be made), while ratios within the overlapping interval $\gamma_{rc}-\Delta\gamma_{r1}$ and $\gamma_{rc}+\Delta\gamma_{r2}$ indicate either dry road or runway, or road/runway with both water and ice if also at least one of the spectral albedos $A_{i=1,2,3}$ is smaller than a corresponding critical value, $A_{i=1,2,3}{}^{rc}$ indicating the presence of an absorber of electromagnetic radiation on the surface.

For additional information relating to the present teachings, attention is directed to commonly assigned U.S. Pat. Nos. 9,297,755, 9,304,081, and 10,621,865, which are incorporated herein by reference.

In summary, in some embodiments, a method for monitoring clouds, hydrometeors, aircraft icing, and the conditions of the surface of an area of interest is provided. The method consists of making time gated measurements of the first parameter (the airspace or the hydrometeors reflectance), and the second parameter (the road, runway, taxiway, or movement area reflectance, possibly including reflectance signals from hydrometeors within the field of view) in three spectral bands centered at wavelengths $\lambda_1$, $\lambda_2$ and $\lambda_3$. After these measurements, the scaled reflectance $\check{R}_1$ measured at $\lambda_1$, the scaled reflectance $\check{R}_2$ measured at $\lambda_2$, and the scaled reflectance $\check{R}_3$ measured at $\lambda_3$, are calculated first based on the first parameter to characterize the hydrometeors, and then based on the second parameter to assess the condition of the road, runway, taxiway, or movement area. The preferred scaling factors are Lambertian reflectance at each of these three wavelengths, $\lambda_1$, $\lambda_2$ and $\lambda_3$. The aircraft icing hazard potential is assessed based on measurements of the first parameter, while the conditions of the surface of interest are assessed based on measurements of the second parameter.

Furthermore, in summary, the present teachings provide a method for characterizing cloud drops, other hydrometeors, assessing aircraft icing hazard level, and assessing the condition of the road, runway, taxiway, or movement area around of a vehicle, even in inclement weather, that could comprise of the following steps:

Conduct time gated measurements of the first parameter (the airspace or the hydrometeors reflectance), and the second parameter (the road, runway, taxiway, or movement area reflectance, possibly including reflectance signals from hydrometeors within the field of view) in three spectral bands centered at wavelengths $\lambda_1$, $\lambda_2$ and $\lambda_3$. After these measurements, calculate the scaled reflectance $\check{R}_1$ measured at $\lambda_1$, the scaled reflectance $\check{R}_2$ measured at $\lambda_2$, and the scaled reflectance $\check{R}_3$ measured at $\lambda_3$, first based on the first parameter to characterize the hydrometeors, and then based on the second parameter to assess the condition of the road, runway, taxiway, or movement area. The preferred scaling factors are Lambertian reflectance at each of these three wavelengths, $\lambda_1$, $\lambda_2$ and $\lambda_3$;

Use the first parameter reflectance $\check{R}_1$, $\check{R}_2$ and $\check{R}_3$ to determine if hydrometeors are present in the airspace. Hydrometeors are determined to be present if at least one of the first parameter scaled reflectance $\check{R}_{i=1,2,3}$ is larger than the corresponding critical value, $\check{R}_{i=1,2,3}{}^{hc}$;

If hydrometeors are present in the airspace, determine if they are composed of ice, water, or mixtures of ice and water; that is, determine the thermodynamic phase of the hydrometeors. The thermodynamic phase of the hydrometeors is determined by calculating the ratio $\gamma$ of the first parameter scaled reflectance measured at wavelengths $\lambda_2$ and $\lambda_3$, that is $$\gamma = \frac{\check{R}_3}{\check{R}_2},$$

where for preferred spectral bands $\gamma < \gamma_{hc}{}^{ice}$ indicates ice particles and $\gamma \geq \gamma_{hc}{}^{water}$ indicates water drops. Once the thermodynamic phase of the hydrometeors is determined, the imaginary part of the complex index of refraction of water substance in the three measurements bands is determined with the aid of a look up table. The index of refraction is used to determine the characteristics of the hydrometeors in subsequent steps;

If hydrometers are not present in the airspace, use the second parameter scaled reflectance $\check{R}_1$, $\check{R}_2$ and $\check{R}_3$ to determine the road condition, or runway, taxiway, or movement area condition when the aircraft is at or near the ground. In this case, the road, runway, taxiway, or movement area condition is determined by calculating the ratio $\gamma$ of the second parameter scaled reflectance measured at wavelengths $\lambda_2$ and $\lambda_3$, that is $$\gamma = \frac{\check{R}_3}{\check{R}_2},$$

where for preferred spectral bands $\gamma < \gamma_{rc}$ indicates icy road and $\gamma \geq \gamma_{rc}$ indicates water on the road or runway, while ratios within the overlapping interval $\gamma_{rc} - \Delta\gamma_{r1}$ and $\gamma_{rc} + \Delta\gamma_{r2}$ indicate either dry road, runway, taxiway, or movement area, or covered with both water and ice, if at least one of the second parameter scaled reflectance $\check{R}_{i=1,2,3}$ is smaller than a corresponding critical value, $\check{R}_{i=1,2,3}{}^{rc}$ indicating the presence of an absorber of electromagnetic radiation;

Use the first parameter scaled reflectance to determine the hydrometeors effective radius $a_e$, and the hydrometeors cloud liquid water path w, by solving a system of radiative transfer equations, one equation being for the scaled reflectance $\check{R}_1$ in a spectral band centered at wavelength $\lambda_1$ selected between the ultraviolet and near infrared portions of the spectrum, where the absorption of electromagnetic radiation by water and ice is small enough to be neglected, and the other equation being for the scaled reflectance $\check{R}_2$ in a band centered at wavelength $\lambda_2$ selected in the shortwave infrared portion of the spectrum where the absorption of electromagnetic radiation by water and ice is large enough to affect reflectance significantly. The system of equations is preferably derived mathematically from simplifications of the radiative transfer equations, one equation being for the scaled reflectance at $\lambda_1$, that is $$\check{R}_1(a_e,w) = R_\infty{}^0(\theta) - f(a_e,w,\theta,A_1),$$

and the other equation being for the scaled reflectance at $\lambda_2$, that is $$\check{R}_2(a_e,w) = R_\infty{}^0(\theta)g(a_e,w) + h(a_e,w,A_2) + q(a_e,w,\theta),$$

where $R_\infty{}^0(\theta)$ is the reflection function of a semi-infinity non-absorbing cloud of hydrometeors, $\theta$ is the scattering angle in radians, $a_e$ is the hydrometeors effective radius, w is the hydrometeors cloud liquid water path, $A_1$ is the surface (e.g., road, runway, taxiway, or movement area) albedo at a spectral band centered at wavelength $\lambda_1$, $A_2$ is the surface (e.g., road, runway, taxiway, or movement area) albedo at a spectral band centered at wavelength $\lambda_2$, and f, g, h and q are analytical functions. The dependence on the index of refraction is included implicitly in the analytical functions listed above;

Write the system of equations of the step above as a single analytical equation of a single variable, the hydrometeors effective radius $a_e$, using the equation for the first parameter reflectance $\check{R}_1$ to determine the hydrometeors cloud liquid water path w as a function of the hydrometeors effective radius $\tilde{w}(a_e)$, and substituting the expression for it in the equation for the first parameter reflectance $\check{R}_2$, that is $$\check{R}_2(a_e)=R_\infty^0(\theta)f(a_e,\tilde{w})+g(a_e,\tilde{w},A_2)+h(a_e,\tilde{w},\theta).$$

Then, determine the hydrometeors effective radius $a_e$ by finding the root of this equation with the aid of a root-finding subroutine like zbrent (Brent, 1973);

Determine the hydrometeors cloud ice content, liquid water content, or mixed phase content. Once the hydrometeors effective radius $a_e$ is determined, the hydrometeors cloud liquid water path w is calculated using the analytical expression for it (the hydrometeors liquid water path w as a function of the hydrometeors effective radius), that is $w=\tilde{w}(a_e)$. Because the reflectance measurements are time gated, the path length l is known, and therefore the liquid water content (LWC), ice water content (IWC), or mixed water phase content (MWC) can be estimated as $$IWC \text{ or } LWC \text{ or } MWC = \frac{w}{l}.$$

If the result of step 3 is that ice has been detected, the result of is flagged as IWC, if water has been detected, it is flagged as LWC, and if mixed phase has been detected, it is flagged as MWC;

Determine the hydrometeors mean and maximum mean volume radius. From the hydrometeors effective radius $a_e$, their mean volume radius and maximum radius are estimated based on the typical drop size distribution (e.g., gamma) for clouds, drizzle, and rain;

Use the second parameter to determine the road, runway, taxiway, or movement area condition in inclement weather. Once the hydrometeors effective radius $a_e$ and liquid water path w are known, the radiative transfer equations of step 5, are solved for the surface spectral albedos by using a root finding subroutine like zbrent. That is, the spectral albedo $A_1$ is determined by finding the root of the second parameter scaled reflectance at $\lambda_1$, that is $$\check{R}_1(A_1)=R_\infty^0(\theta)-f(a_e,w,\theta,A_1),$$

the spectral albedo $A_2$ is determined by finding the root of the second parameter scaled reflectance at $\lambda_2$, that is $$\check{R}_2(A_2)=R_\infty^0(\theta)g(a_e,w)+h(a_e,w,A_2)+q(a_e,w,\theta),$$

and the spectral albedo $A_3$ is determined by finding the root of the second parameter scaled reflectance at $\lambda_3$, that is $$\check{R}_3(A_3)=R_\infty^0(\theta)g(a_e,w)+h(a_e,w,A_3)+q(a_e,w,\theta);$$

Determine the road, runway, taxiway, or movement area condition in inclement weather by calculating the ratio $\gamma$ of the surface spectral albedos at wavelengths $\lambda_2$ and $\lambda_3$, that is $$\gamma = \frac{A_3}{A_2},$$

where for preferred spectral bands $\gamma<\gamma_{rc}$ indicates icy road and $\gamma\geq\gamma_{rc}$ indicates water on the road or runway, while ratios within the overlapping interval $\gamma_{rc}-\Delta\gamma_{r1}$ and $\gamma_{rc}+\Delta\gamma_{r2}$ indicate either dry road or runway, or road/runway with both water and ice if also at least one of the spectral albedos $A_{i=1,2,3}$ is smaller than a corresponding critical value, $A_{i=1,2,3}^{rc}$ indicating the presence of an absorber of electromagnetic radiation on the surface.

The foregoing description of the embodiments has been provided for purposes of illustration and description. It is not intended to be exhaustive or to limit the disclosure. Individual elements or features of a particular embodiment are generally not limited to that embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for characterizing hydrometeors in an airspace and characterizing a surface of interest, the method comprising:
   conducting time gated reflectance measurements of a first parameter in three spectral bands centered at wavelengths $\lambda_1$, $\lambda_2$ and $\lambda_3$ to determine the first parameter reflectances $R_1$ at $\lambda_1$, $R_2$ at $\lambda_2$, and $R_3$ at $\lambda_3$, respectively;
   conducting time gated reflectance measurements of a second parameter in three spectral bands centered at wavelengths $\lambda_1$, $\lambda_2$ and $\lambda_3$ to determine the second parameter reflectances $R_1$ at $\lambda_1$, $R_2$ at $\lambda_2$, and $R_3$ at $\lambda_3$, respectively;
   determining if hydrometeors are present in the airspace by verifying if at least one of the first parameter reflectances $R_{i=1,2,3}$ is larger than a corresponding critical value, $R_{i=1,2,3}^{hc}$, where the subscripts correspond to wavelengths $\lambda_1$, $\lambda_2$ and $\lambda_3$, and outputting a hydrometeor determination signal;
   characterizing the surface of interest based on a combination of the value of at least one of the first parameter reflectances $R_{i=1,2,3}$, and at least one of the second parameter reflectances $R_{i=1,2,3}$ and outputting a surface characterization signal; and
   outputting a signal in response to at least the hydrometeor determination signal or the surface characterization signal.

2. The method of claim 1 wherein the wavelength $\lambda_3$ is identical to wavelength $\lambda_2$.

3. The method according to claim 1 wherein hydrometeors present in the airspace are characterized based on the value of at least one of the first parameter reflectances $R_{i=1,2,3}$.

4. The method of claim 1 wherein the wavelength $\lambda_1$ is selected between the ultraviolet and near infrared portions of the spectrum, where the absorption of electromagnetic radiation by water and ice is small enough to be neglected, and the wavelength $\lambda_2$ is selected in the shortwave infrared portion of the spectrum where the absorption of electromagnetic radiation by water and ice is large enough to affect reflectance significantly.

5. The method according to claim 1 wherein the first parameter comprises only airspace around a measurement device, the airspace possibly containing hydrometeors.

6. The method according to claim 2 wherein the second parameter comprises both the surface of interest and the airspace between the measurement device and the surface of interest.

7. The method according to claim 1 further comprising:
calculating first parameter scaled reflectances $\check{R}_{1,2,3}$ based on the first parameter reflectances $R_{i=1,2,3}$ divided by Lambertian scaling factors at $\lambda_1$, $\lambda_2$, and $\lambda_3$, respectively;
calculating second parameter scaled reflectances $\check{R}_{1,2,3}$ based on the second parameter reflectances $R_{i=1,2,3}$ divided by Lambertian scaling factors at $\lambda_1$, $\lambda_2$, and $\lambda_3$, respectively; and
determining the thermodynamic phase of the hydrometeors by calculating a ratio $\gamma$ of the first parameter scaled reflectances measured at wavelengths $\lambda_2$ and $\lambda_3$ expressed as $$\gamma = \frac{\tilde{R}_3}{\tilde{R}_2},$$

where for preferred spectral bands $\gamma \geq \gamma_{hc}^{ice}$ indicates ice particles and $\gamma < \gamma_{hc}^{water}$ indicates water drops.

8. The method according to claim 7, further comprising:
determining an effective radius $a_e$ of the hydrometeors and a hydrometeors cloud liquid water path w using the first parameter scaled reflectance by solving a pair of radiative transfer equations, one of the pair of radiative transfer equations being for the first parameter scaled reflectance $\check{R}_1$ and the other of the pair of radiative transfer equations being for the first parameter scaled reflectance $\check{R}_2$, the pair of radiative transfer equations is derived mathematically from simplifications of radiative transfer equations, one of the radiative transfer equations being for the scaled reflectance at $\lambda_1$ and the other of the radiative transfer equations being for the scaled reflectance at $\lambda_2$.

9. The method according to claim 8, wherein the pair of radiative transfer equations is reduced to a single analytical equation of a single variable being the hydrometeors effective radius $a_e$ by using the equation for the first parameter scaled reflectance $\check{R}_1$ to determine the hydrometeors cloud liquid water path w as a function of the hydrometeors effective radius $w=\tilde{w}(a_e)$, and then determining the effective radius $a_e$ of the hydrometeors by finding the root of the single analytical equation using a root-finding method.

10. The method according to claim 8 wherein the hydrometeors cloud liquid water path w is calculated using an analytical expression for the hydrometeors liquid water path w as a function of the hydrometeors' effective radius $w=\tilde{w}(a_e)$ and the time gated reflectance measurements have a known path length l, the method further comprising:
determining ice content, liquid water content, or mixed phase content of the hydrometeors using the effective radius $a_e$ of the hydrometeors and the path length l.

11. The method according to claim 8, further comprising determining a mean and maximum mean volume radius of the hydrometeors.

12. The method of claim 8, further comprising:
following the determining an effective radius $a_e$ of the hydrometeors and a hydrometeors cloud liquid water path w, using the pair of radiative transfer equations to solve for surface spectral albedos; and
characterizing the surface of interest based on the values of the surface spectral albedos in at least two wavelengths.

* * * * *

UNITED STATES PATENT AND TRADEMARK OFFICE
CERTIFICATE OF CORRECTION

PATENT NO. : 11,719,826 B1  
APPLICATION NO. : 17/679556  
DATED : August 8, 2023  
INVENTOR(S) : Nilton O. Rennó

Page 1 of 1

It is certified that error appears in the above-identified patent and that said Letters Patent is hereby corrected as shown below:

In the Claims

At Column 16, Claim number 10, Line numbers 15-16, delete "w=w̌ ($a_e$)" and insert -- w = w̃($a_e$) --.

Signed and Sealed this  
Twenty-sixth Day of September, 2023

Katherine Kelly Vidal  
*Director of the United States Patent and Trademark Office*